(12) United States Patent
Flood et al.

(10) Patent No.: US 10,002,074 B2
(45) Date of Patent: *Jun. 19, 2018

(54) NON-INTRUSIVE STORAGE OF GARBAGE COLLECTOR-SPECIFIC MANAGEMENT DATA

(71) Applicant: Red Hat, Inc., Raleigh, NC (US)

(72) Inventors: Christine H. Flood, Westford, MA (US); Andrew Edward Dinn, Newcastle upon Tyne (GB)

(73) Assignee: Red Hat, Inc., Raleigh, NC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/174,047

(22) Filed: Jun. 6, 2016

(65) Prior Publication Data

US 2016/0283371 A1 Sep. 29, 2016

Related U.S. Application Data

(63) Continuation of application No. 14/018,279, filed on Sep. 4, 2013, now Pat. No. 9,361,224.

(51) Int. Cl.
*G06F 12/02* (2006.01)

(52) U.S. Cl.
CPC ...... *G06F 12/0253* (2013.01); *G06F 12/0269* (2013.01); *G06F 2212/1016* (2013.01); *G06F 2212/1044* (2013.01)

(58) Field of Classification Search
CPC ............. G06F 12/0253; G06F 12/0261; G06F 12/0269; G06F 12/0276; G06F 2212/1016; G06F 2212/1044
See application file for complete search history.

(56) References Cited

U.S. PATENT DOCUMENTS

| 4,775,932 | A  | 10/1988 | Oxley et al. |
| 5,560,003 | A  | 9/1996 | Nilson et al. |
| 6,279,148 | B1 | 8/2001 | Taivalsaari et al. |
| 6,317,872 | B1 | 11/2001 | Gee et al. |

(Continued)

OTHER PUBLICATIONS

Wikipedia, "Memory address," Aug. 2013, pp. 1-4, downloaded from The Wayback Machine Internet Archive at <url>:https://web.archive.org/web/20130802035225/https://en.wikipedia.org/wiki/Memory_address.*

(Continued)

*Primary Examiner* — Thuy Dao
*Assistant Examiner* — Stephen Berman
(74) *Attorney, Agent, or Firm* — Haynes and Boone, LLP

(57) ABSTRACT

A system, method, and techniques for managing memory are provided. An example method includes identifying a plurality of regions in a heap storing one or more objects of a first type and one or more objects of a second type. Each object of the first type includes application data and management data, and the management data is used by a managed runtime to manage the application data. The method also includes determining an object of the first type to read and computing, based on a last-known memory address of the object of the first type, a memory address of an object of the second type storing a current memory address of the object of the first type. The method further includes reading the current memory address stored in the object of the second type and locating the object of the first type at the read memory address.

15 Claims, 5 Drawing Sheets

(56) References Cited

U.S. PATENT DOCUMENTS

| | | | |
|---|---|---|---|
| 6,611,898 B1 | 8/2003 | Slattery et al. | |
| 7,036,120 B2 | 4/2006 | Sokolov et al. | |
| 7,107,426 B2 | 9/2006 | Kolodner et al. | |
| 7,162,712 B2 | 1/2007 | Shaylor et al. | |
| 7,313,566 B1 | 12/2007 | Printezis et al. | |
| 7,454,448 B1 | 11/2008 | Daynes et al. | |
| 7,519,640 B1 | 4/2009 | Garthwaite | |
| 7,756,911 B2 | 7/2010 | Bacon et al. | |
| 7,853,628 B1 | 12/2010 | Fresko et al. | |
| 7,975,114 B2 * | 7/2011 | Tene | G06F 12/0269 707/813 |
| 8,375,377 B2 | 2/2013 | Normington et al. | |
| 9,436,595 B1 * | 9/2016 | Benitez | G06F 12/0246 |
| 2003/0140071 A1 | 7/2003 | Kawamoto | |
| 2004/0001010 A1 | 1/2004 | Shaylor et al. | |
| 2004/0111718 A1 | 6/2004 | Detlefs | |
| 2004/0122875 A1 * | 6/2004 | Garthwaite | G06F 12/0269 |
| 2006/0230087 A1 | 10/2006 | Andreasson | |
| 2007/0011415 A1 | 1/2007 | Kaakani et al. | |
| 2008/0155246 A1 * | 6/2008 | Jennings | G06F 9/4401 713/2 |
| 2008/0281888 A1 * | 11/2008 | Tene | G06F 12/0269 |
| 2009/0319720 A1 * | 12/2009 | Stefanus | G06F 12/0246 711/103 |
| 2009/0327377 A1 | 12/2009 | Ylonen | |
| 2010/0057792 A1 | 3/2010 | Ylonen | |
| 2010/0280996 A1 | 11/2010 | Gross, IV et al. | |
| 2011/0252216 A1 | 10/2011 | Ylonen et al. | |
| 2011/0276776 A1 | 11/2011 | Ylonen | |
| 2011/0282920 A1 * | 11/2011 | Ogasawara | G06F 12/0269 707/813 |
| 2012/0239711 A1 * | 9/2012 | Burka | G06F 12/0253 707/816 |
| 2013/0086132 A1 * | 4/2013 | Hunt | G06F 12/0253 707/819 |
| 2013/0086569 A1 * | 4/2013 | Chapman | G06F 9/45516 717/158 |
| 2013/0111144 A1 * | 5/2013 | Koradhanyamath | G06F 12/0253 711/135 |
| 2015/0026428 A1 * | 1/2015 | Bobroff | G06F 12/0253 711/170 |

OTHER PUBLICATIONS

Blackburn et al., "Myths and realities: the performance impact of garbage collection," 2004, Proceedings of the joint international conference on Measurement and modeling of computer systems, pp. 25-36.*

Blackburn et al., "Oil and Water? High Performance Garbage Collection in Java with MMTk," 2004, Proceedings of the 26th International Conference on Software Engineering, pp. 137-146.*

Huang et al., "The garbage collection advantage: improving program locality," 2004, Proceedings of the 19th annual ACM SIGPLAN conference on Object-oriented programming, systems, languages, and applications, pp. 69-80.*

Rodney A. Brooks, Trading Data Space for Reduced Time and Code Space in Real-Time Garbage Collection on Stock Hardware, 1984, pp. 256-262, Computer Science Department, Stanford University, 1984 ACM, New York, New York, USA.

Erik Osterlund; Garbage Collection Supporting Automatic JIT Parallelization in JVM, Jun. 26, 2012, 29 pages, Linnaeus University School of Computer Science, Physics and Mathematics; Sweden.

Erik Helin; Improving Load Balancing During the Marking Phase of Garbage Collection; 2012, 82 pages, KTH Computer Science and Communication, KTC CSC, Stockholm, Sweden.

Blackburn, et al., "Immix: a mark-region garbage collector with space efficiency, fast collection, and mutator performance," 2008, proceedings of the 29$^{th}$ ACM SIGPLAN Conference on Programming Language Design and Implementation, pp. 22-32.

Domani, et al., "Thread-local heaps for Java," 2002, Proceedings of the 3$^{rd}$ International Symposium on Memory management, pp. 76-87.

Detlefs, et al., "Garbage-first garbage collection," 2004, Proceedings of the 4$^{th}$ International Symposium on Memory management, pp. 37-48.

* cited by examiner

Target Collection Region    Destination Region

Target Collection Region    Destination Region

NON-INTRUSIVE STORAGE OF GARBAGE COLLECTOR-SPECIFIC MANAGEMENT DATA

CROSS REFERENCE TO RELATED APPLICATIONS

This application is a continuation of U.S. application Ser. No. 14/018,279, filed Sep. 4, 2013, which issued as U.S. Pat. No. 9,361,224 on Jun. 7, 2016, entitled "Non-Intrusive Storage of Garbage Collector-Specific Management Data," which is incorporated by reference in its entirety herein.

FIELD OF DISCLOSURE

The present disclosure generally relates to memory management, and more particularly to garbage collection.

BACKGROUND

In the field of computer systems, a program may allocate memory for objects from a free memory area called a heap. Memory is allocated to, and freed from, the heap. Eventually, when the objects are no longer being referenced by the program, the memory allocated for the created objects is reclaimed through a garbage collection process. Garbage collection may refer to a process of identifying unused areas of main memory storage. The garbage collection process clears the objects from memory, and the once allocated memory is again available for use.

Modern programs may dynamically generate objects that are stored on the heap. Although different uses of the term may exist, the discussion that follows will use heap to refer to shared memory managed by automatic garbage collection. The garbage collector has control of and/or direct access and/or knowledge of the addresses, classes, roots, and other such detailed information about all live objects created in the system. After an object is no longer needed, it may be desirable to reclaim the memory allocated to the object to prevent the system from running out of memory as more temporary objects fill the heap. Garbage collectors operate by reclaiming space that is no longer "reachable."

In some systems, which are usually known as "object oriented," objects may have associated methods, which are routines that can be invoked by reference to the object. An object may belong to a class, which is an organizational entity that may contain method code or other information shared by all objects belonging to that class. In the discussion that follows, though, the term object will not be limited to such structures; it will additionally include structures with which methods and classes are not associated.

BRIEF SUMMARY

This disclosure relates to memory management. Methods, systems, and techniques for managing memory are disclosed.

According to an embodiment, a system for managing memory includes a memory including a heap. The heap is partitioned into a plurality of regions and stores one or more objects of a first type and one or more objects of a second type. Each object of the first type includes application data and management data, and the management data is used by a managed runtime to manage the application data. The system also includes one or more processors coupled to the memory. The system further includes one or more mutator threads executing on the one or more processors. A mutator thread of the one or more mutator threads determines an object of the first type to read, computes, based on a last-known memory address of the object of the first type, a memory address of an object of the second type storing a current memory address of the object of the first type, reads the current memory address stored in the object of the second type, and locates the object of the first type at the read memory address.

According to another embodiment, a method of managing memory includes identifying a plurality of regions in a heap storing one or more objects of a first type and one or more objects of a second type. Each object of the first type includes application data and management data, and the management data is used by a managed runtime to manage the application data. The method also includes determining an object of the first type to read. The method further includes computing, based on a last-known memory address of the object of the first type, a memory address of an object of the second type storing a current memory address of the object of the first type. The method also includes reading the current memory address stored in the object of the second type. The method further includes locating the object of the first type at the read memory address.

According to another embodiment, a non-transitory machine-readable medium including a plurality of machine-readable instructions that when executed by one or more processors is adapted to cause the one or more processors to perform a method including: identifying a plurality of regions in a heap storing one or more objects of a first type and one or more objects of a second type, each object of the first type including application data and management data, where the management data is used by a managed runtime to manage the application data; determining an object of the first type to read; computing, based on a last-known memory address of the object of the first type, a memory address of an object of the second type storing a current memory address of the object of the first type; and reading the current memory address stored in the object of the second type; and locating the object of the first type at the read memory address.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

Figure 1:
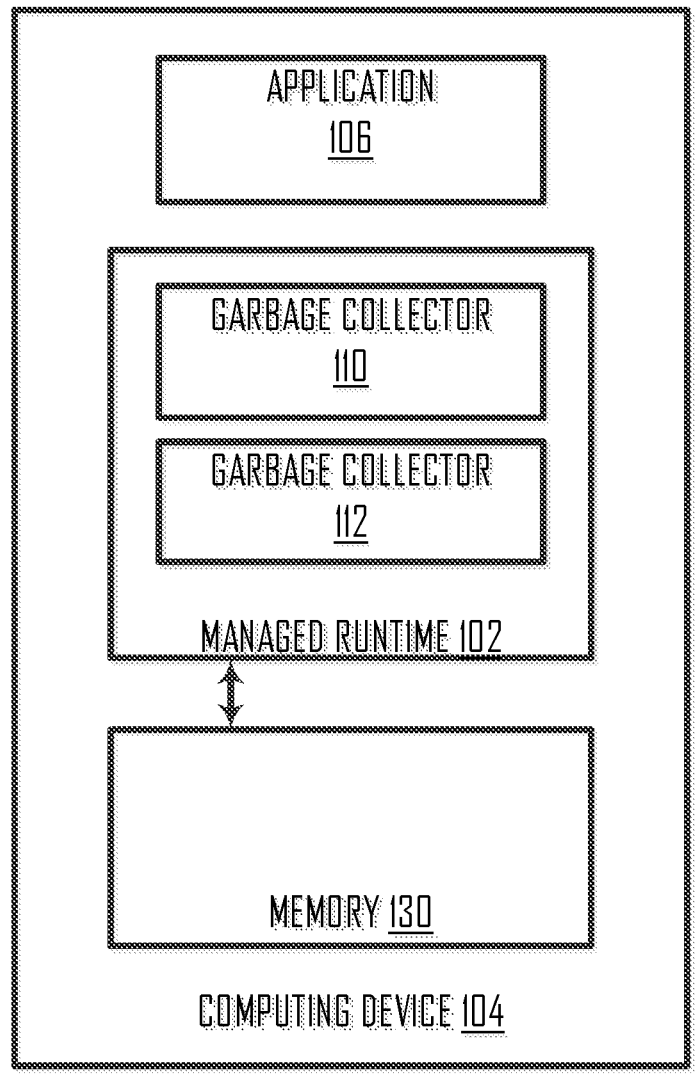
FIG. 1 is a simplified block diagram illustrating a system for managing memory, according to an embodiment.

I. Overview
II. Example System Architecture
  A. Reference Object and Shared Object
    1. Header Fields and Application-Specific Data in Shared Object
    2. Reference Object References Shared Object
  B. Read Barrier
    1. Shared Object Located in Targeted Collection Region
    2. Shared Object Located in Destination Region
  C. Alignment of Objects
III. Example Method
IV. Example Computing System I. Overview It is to be understood that the following disclosure provides many different embodiments, or examples, for implementing different features of the present disclosure. Some embodiments may be practiced without some or all of these specific details. Specific examples of modules and arrangements are described below to simplify the present disclosure. These are, of course, merely examples and are not intended to be limiting.

Many software applications rely on a managed runtime, a software component that provides services to manage an application's use of specific hardware resources. Common benefits of employing a managed runtime may be that the task of the application developer is simplified, portability to different hardware is provided, and the available resources (e.g., memory) are better used.

Different garbage collectors with widely varying costs and benefits exist. Managed runtimes may implement more than one garbage collector, allowing an application to be run with the one whose cost-benefit trade-off best suits the needs of the application. The present disclosure may be used in relation to a managed runtime that supports the use of multiple, alternative garbage collectors. This is not intended to be limiting, and it should be understood that the present disclosure may also be used in relation to a managed runtime that supports the use of a single garbage collector that can benefit from and use the techniques presently disclosed.

A managed runtime may be a virtual machine. An example of a managed runtime is a JAVA® virtual machine (JVM) such as OPENJDK®. Trademarks are the property of their respective owners. OPENJDK® JVM supports the use of multiple, alternative garbage collectors. The standard unit of allocation for a garbage collector is a single application data record and may be referred to as an object. The garbage collector may record management information that helps the garbage collector manage the objects in use and also manage the memory that is available for allocation. An object includes one or more headers and application-specific data. A header may include the management data, and the headers may be stored at a beginning of the object (e.g., before the application-specific data). In a single managed runtime that employs multiple garbage collectors, these garbage collectors may use a lot of the same management data.

A conventional approach to storing management data is to embed the management data within the objects themselves, allowing the management data to be accessed efficiently and simplifying relocation or copying of the object. In the OPENJDK® JVM, for example, the first few memory words of an object include a header area containing management data used by both the garbage collector and other systems in the managed runtime.

A particular garbage collector may use information specific to the particular garbage collector and that is not required by all or possibly any of the other garbage collectors. A conventional solution to store the information specific to the particular garbage collector is to employ a header large enough to contain the common subset plus as much variant data specific to the particular garbage collector for the scheme with the largest data requirements. For example, each object may include a header containing an extra field that is used by the particular garbage collector, but not used by any of the other garbage collectors. This solution, however, wastes a word of memory per object when not using the particular garbage collector.

A conventional solution to overcome the wasted word of memory per object is to vary the size of the header and, therefore the offset to the start of the application-specific data, to fit the needs of the chosen garbage collector. The code that manages the application data, however, will need to cope with this variation in header size. This may be resolved by computing the relevant offset at each access, but affects performance because the managed runtime and application code are performing more computations. A given managed runtime's management data commonly occupies a fixed initial segment of each object while the remaining contents of the object's data area vary according to the application's needs. Although these contents have varying layout and size, the offset to the start of the application-specific part of the data area is typically constant. Keeping this offset fixed regardless of which management scheme is in use is important so that code that accesses the application-specific data, both the managed runtime services and the application itself, can make the simplifying assumption that the application-specific data in the object are located at a fixed offset from the start of the object.

The variation in header size may also be resolved by building alternative versions of the program that employ their own different fixed offset, each version being based on the different sizes required for the chosen garbage collector. This alternative, however, affects usability because a user may be requested to install and select between alternative variants of the delivered program.

It may be desirable to overcome these disadvantages. For example, it may be desirable to incorporate the needs of the particular garbage collector to store different management data while avoiding the waste of space detailed above and further avoiding the performance or usability constraints associated with employing variant header sizes.

It may also be desirable to allow threads of this particular garbage collector and of the application (e.g., application 106) to run concurrently. This may eliminate or greatly reduce user observable garbage collector pause times. This is in contrast to other garbage collection approaches that rely on stopping the mutator threads while performing garbage collection. The term mutator may be used to distinguish the part of the program that does "useful" work from that which does the garbage collection. This "stop-the-world" scenario allows the garbage collector to evacuate objects from a target collection region of the heap to a destination region of the heap, and then update the mutator threads so that they point to the relocated objects in the destination region. During the "stop-the-world" phase, the mutator threads are halted. Any live objects in a target collection region of the heap will be evacuated to a destination region of the heap. An object has been evacuated when a copy of the object has been stored on the destination heap.

While garbage collector threads are running concurrently with mutator threads, a mutator thread may attempt to read an object that the garbage collector thread is about to evacuate or has evacuated from the target collection region to the destination region of the heap. If the garbage collector has evacuated the object to the destination region, the mutator thread may read the wrong object if the mutator thread has not yet been informed of the object's updated location. It may be desirable to implement a read barrier such that a mutator thread reads from the most up-to-date location of the object.

II. Example System Architecture

The present disclosure provides techniques to locate data specific to a given garbage collector in front of the memory area used to store an object. The data specific to the particular garbage collector may be a reference, and the object may be identified by the reference. The reference may be a relatively small amount of information that is used to access the object.

FIG. 1 is a simplified block diagram 100 illustrating a system for managing memory, according to an embodiment. Diagram 100 includes a managed runtime 102 that executes on a computing device 104. Computing device 104 may be a workstation, computer, server, game console, set-top box, kiosk, embedded system, mobile device (e.g., a mobile phone, personal digital assistant, tablet, and laptop), or other device having at least one processor and memory.

Managed runtime 102 may be a software program that communicates with an application 106 executing on computing device 104. Managed runtime 102 may include a garbage collector 110, 112 that is responsible for managing the memory resources of the hardware. A garbage collector may allocate areas of memory 130 to application 106 on demand, and when the memory area is no longer in use by the program, reclaim the memory area for reuse. Memory 130 may include a free memory area called a heap, and application 106 may dynamically generate objects that are stored on the heap. The heap may be partitioned into a plurality of regions that store objects. At any one time, the heap may include one or more target collection regions, destination regions, and regular regions. These designations may change in subsequent garbage collection cycles. A thread may evacuate reachable objects from a target collection region to a destination region.

Garbage collectors 110 and 112 may be present in the delivered program binary. In an example, only one of garbage collectors 110 and 112 is selected to operate in any given program run. In another example, a plurality of garbage collectors (e.g., garbage collectors 110 and 112) are selected to operate in any given program run. The plurality of garbage collectors may execute concurrently during a single program run, each managing objects allocated from its own subset of the heap. In an example, different garbage collectors may be used to provide more or less timely allocation for different categories of applications if managed runtime 102 were used to support deployment of a suite of applications. It may be beneficial to use the same shared managed runtime/application data layout in the shared application object and, hence, locate any variant data (e.g., forwarding pointer) used by one of the garbage collectors but not another of the garbage collectors in a separate preceding object.

A. Reference Object and Shared Object

Figure 2:
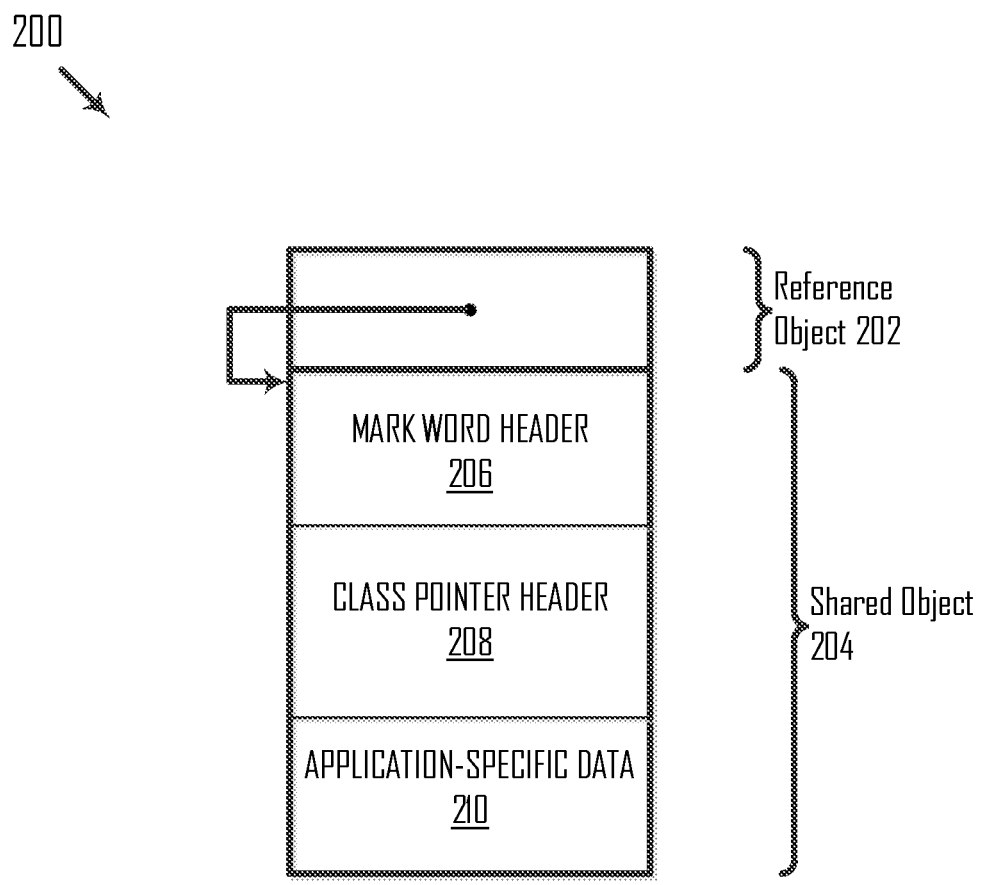
FIG. 2 is a diagram illustrating a reference object and a shared object, according to an embodiment.

FIG. 2 is a diagram 200 illustrating a reference object 202 and a shared object 204, according to an embodiment. Memory may be allocated from the heap for reference object 202 and shared object 204.

Shared object 204 includes a set of headers (e.g., mark word header 206 and class pointer header 208) and application-specific data 210. Although two headers are illustrated, other embodiments having more or fewer than two headers are within the scope of this disclosure. Further, it should be understood that a header may store management data different from that described in the disclosure.

A header may be included in all allocated objects and may be unused by the application for which the object is allocated. Rather, the header may be used by the managed runtime to manage the application-specific data to ensure proper and consistent execution of the application (e.g., the application can manipulate fields within shared object 204). It may be beneficial to store the set of headers at the front of shared object 204 so that application-specific data 210 starts at the same location in each shared object. As such, application-specific data 210 in shared object 204 are located at a fixed offset from the start of the shared object. Two shared objects allocated for the same application or different applications may include the same set of header fields but different application-specific data.

1. Header Fields and Application-Specific Data in Shared Object

In FIG. 2, mark word header 206 and class pointer header 208 are management data that may be used by managed runtime 102 to manage application-specific data 210. Mark word header 206 may be used by garbage collector 110 when it is scanning memory for unused objects to mark objects that have been visited. Mark word header 206 may include a mark/lock word that enables a thread to mark shared object 204 as live and/or information about locking shared object 204 so that another thread is unable to write to shared object 204. Mark word header 206 may also include a unique identifier that identifies shared object 204. The unique identifier may be implemented as, for example, a hashtag.

Class pointer 208 may include the address of a class record describing shared object 204 and, amongst other things, may identify the size of the shared object. In an example, class pointer header 208 includes a class pointer that specifies the object type of shared object 204. Each object (e.g., reference object 202 and shared object 204) in a program is an object of a specific type defined by a program (e.g., the application or virtual machine). Managed runtime 102 may determine based on shared object 204's type what operations may be performed on shared object 204, how to perform operations on shared object 204, and what information is stored in shared object 204.

Application-specific data 210 may refer to data that is defined by and used by application 106. Application-specific data 210 is specific to application 106 for which shared object 204 is allocated. Shared object 204's state may be described as its fields and properties. In an example, application-specific data 210 may include one or more fields. A field may be, for example, a count, a number that represents a cost, or a pointer that identifies text that specifies a person's name in application 106.

2. Reference Object References Shared Object

Object 202 may reference object 204 and be co-located with object 204 (e.g., in a memory address adjacent to and preceding object 204) on a region of the heap. The reference may be represented as a pointer to object 204 or as a memory address of object 204. In an example, reference object 202 may be an object handle that references shared object 204. Reference object 202 may serve as a level of indirection to read shared object 204 such that a thread wanting to read shared object 204 reads reference 202 to determine the most up-to-date location of shared object 204 and then reads shared object 204 at that particular location. In this way, a read barrier may be enforced by having the thread read reference object 202, which includes the reference to shared object 204, to determine the current memory address of shared object 204 before reading shared object 204. This enables the thread to read the correct version of shared object 204 because the thread may hold a stale reference to shared object 204 (e.g., if a thread has evacuated shared object 204 and the thread's reference to shared object 204 has not been updated).

Reference object 202 is separate from shared object 204. A benefit of having reference object 202 separate from shared object 204 may be that the format of the shared object is unchanged and is compatible with other garbage collectors, third-party debugging and performance monitoring tools, and object serialization while still allowing a read barrier. Thus, it may be unnecessary to change the application code or the runtime code. Further, reference object 202 supports a multi-threaded environment and enables one or more threads to read shared objects while they are being marked and/or evacuated from a target collection region to a destination region of the heap.

In an embodiment, reference object 202 may be located at a memory address adjacent to and preceding shared object 204. For example, reference object 202 may be a word that precedes shared object 204 and includes the garbage collector-specific data (e.g., forwarding-pointer field). The garbage collector-specific data may be used as an object handle to locate shared object 204. A client of the garbage collector may never see this garbage collector-specific data. As far as the client is concerned, the memory area used to store the object may start at the following address (e.g., start of shared object 204). A benefit of having reference object 202 be co-located with shared object 204 in this way may be that the read of shared object 204 and the read of reference object 202 may likely hit the same or adjacent cache line, and therefore cost a minimal performance penalty. The reference object could be placed in the shared object, but this may break many tools and would not allow the option of choosing different garbage collector algorithms at run time. Further, the reference object may reside in a different memory area, but this may result in a concurrency bottleneck.

B. Read Barrier

A heap may include a plurality of regions and store one or more shared objects and one or more reference objects. Each shared object may have a corresponding reference object that references the most up-to-date location of the shared object. A shared object that is marked as live and is stored in a target collection region of the heap will eventually be evacuated to a destination region of the heap (e.g., by a garbage collector thread or mutator thread). One or more shared objects may be evacuated to the destination region while application 106 executes on computing device 104. A thread (e.g., garbage collector thread or mutator thread) may identify a plurality of regions in a heap storing one or more shared objects and one or more reference objects and be able to determine which region is a target collection region and which region is a destination region.

A mutator thread may want to read from shared object 204. For example, application 106 may include an instruction that reads a field from application-specific data 210. A mutator reference held by the mutator thread may contain the "last-known memory address" of shared object 204. The last-known memory address of shared object 204 may be in the target collection region (e.g., before shared object 204 has been evacuated to the destination region) and may be the same or different from the current memory address of shared object 204. This mutator reference may be held in a stack location or in a field of another shared object different from shared object 204 (e.g., the other shared object has a reference to shared object 204). In an example, the last-known memory address of shared object 204 may be the last-known memory address of shared object 204 that the mutator thread has in its stack. In another example, the last-known memory address of shared object 204 may be the last-known memory address of shared object 204 that another shared object has of shared object 204 and has passed to the mutator thread. The mutator thread may identify the last-known memory address of shared object 204 and determine whether the last-known memory address is located in a target collection region of the plurality of regions of the heap.

In an embodiment, when the mutator thread determines that the last-known memory address of shared object 204 is located in the target collection region, the mutator thread identifies reference object 202 storing a current memory address of shared object 204. The mutator thread may compute, based on a last-known memory address of shared object 204, a memory address of reference object 202. Computing the memory address of reference object 202 may include computing the memory address of reference object 202 based on an offset from the memory address of shared object 204. In an example, the offset may be subtracted from the address of shared object 204 and a word stored at the offset may be read, where the word stores the current memory address of shared object 204. In another example, the offset may be added to the address of shared object 204 and a word stored at the offset may be read, where the word stores the current memory address of shared object 204.

The last-known memory address of shared object 204 may be adjacent to a memory address of reference object 202, and the memory address of reference object 202 may precede the last-known memory address of shared object 204. The mutator thread may identify the reference object 202 by reading a word in the memory address preceding and adjacent to the last-known memory address of shared object 204. The word may store the current memory address of shared object 204. The mutator thread may read the current memory address stored in reference object 202 and locate shared object 204 at the read memory address. The located shared object may be stored on the target collection region or the destination region of the heap.

Further, when the mutator thread determines that the last-known memory address of shared object 204 is not located in the target collection region, the mutator thread may use the last-known memory address of shared object 204 and directly read from it without accessing reference object 202. As such, a read barrier may be enforced only when the last-known memory address of shared object 204 is in a target collection region.

In another embodiment, the mutator thread performs an indirect read via reference object 202 to read shared object 204 regardless of whether the mutator thread's the last-known memory address of shared object 204. As such, a read barrier may be enforced on all reads to a shared object.

Thus, to avoid reading the wrong object, the mutator thread may identify a reference object (e.g., reference object 202) that stores a current memory address of the shared object to be read (e.g., shared object 204), may read the current memory address stored in the identified reference object, and may locate the shared object at the read memory address. The mutator thread may then read the shared object at the read memory address. In this way, even if the reference used by the mutator thread does not reference the most up-to-date location of shared object 204, the mutator thread may still locate the most up-to-date location of shared object 204 using object reference 202.

Figure 3A:
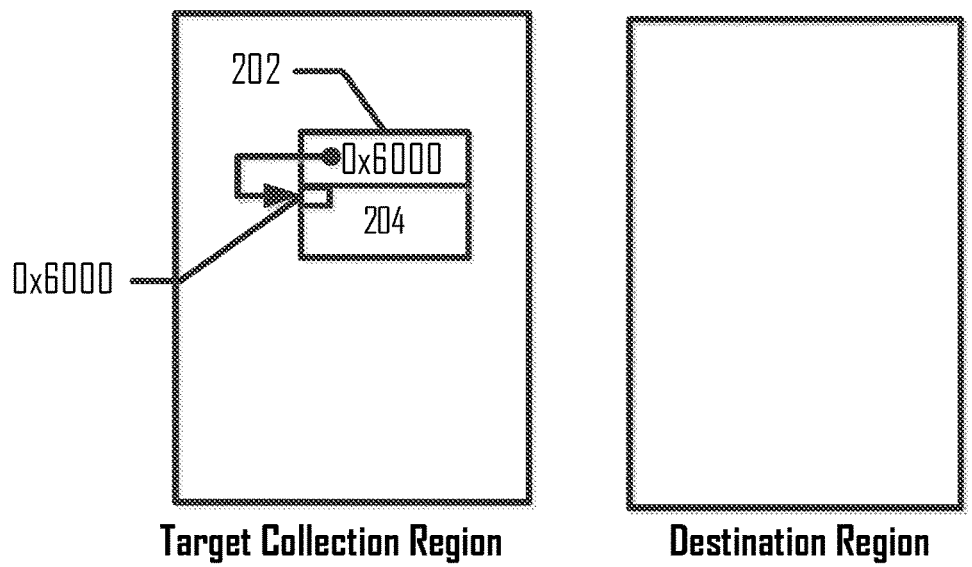
FIGS. 3A and 3B are diagrams illustrating a reference object and shared object stored on one or more regions of the heap, according to an embodiment.
Figure 3B:
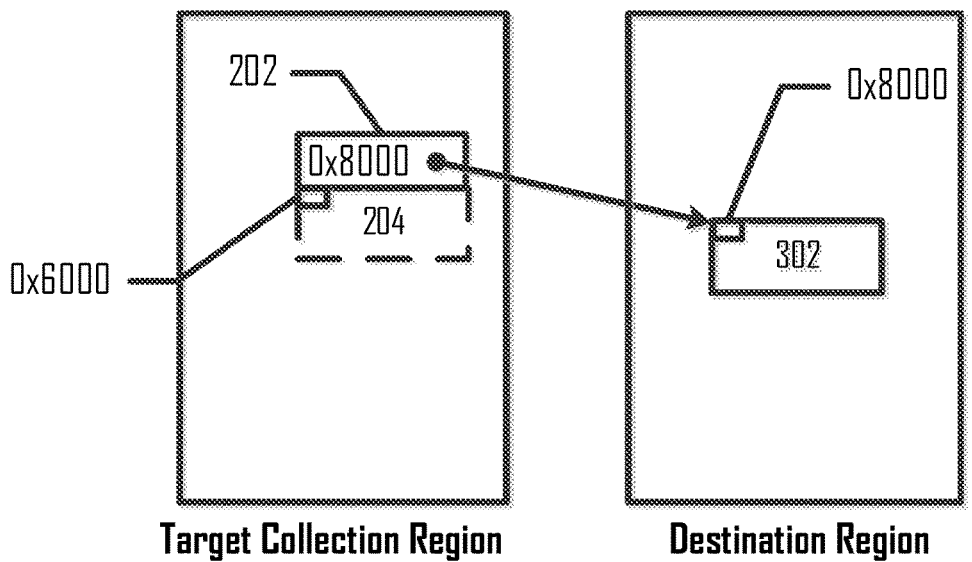

FIGS. 3A and 3B are diagrams illustrating reference object 202 and shared object 204 stored on one or more regions of the heap, according to an embodiment. In each diagram, the reference object may be used to locate the current memory address of the shared object and to read the shared object at that memory address.

1. Shared Object Located in Target Collection Region

A thread (e.g., mutator thread) may start reading shared object 204 located in the target collection region before shared object 204 has been evacuated to the destination region (e.g., by a garbage collector thread or mutator thread). For example, application-specific data 210 may include one or more fields and the thread may want to read a given field in shared object 204. In FIG. 3A, reference object 202 stores the current memory address of shared object 204 (e.g., 0x6000), the most up-to-date location of shared object 204. Shared object 204 has not yet been evacuated to the destination region.

When a reading thread reads shared object 204 before it has been evacuated to the destination region, the thread's last-known memory address of shared object 204 may be the same as the current memory address of the most up-to-date version of shared object 204. As will be discussed below, the memory address the thread ends up with (e.g., 0x6000, the current memory address of shared object 204) points to the location in the target collection region that the thread started with (e.g., 0x6000, the last-known memory address of shared object 204). In this case, the reading of the previous word to indirectly read shared object 204 is redundant but the final address for shared object 204 is correct.

In an embodiment, the reading thread may identify a last-known memory address of shared object 204. This memory address may be held in a stack location or in a field of another shared object different from shared object 204. In an example, the thread's last-known memory address of shared object 204 may be memory address 0x6000. The thread may obtain the last-known memory address of shared object 204 from a stack location or in a field of another shared object different from shared object 204.

The last-known memory address of share object 204 may be adjacent to a memory address of reference object 202. Additionally, the memory address of reference object 202 may precede the last-known memory address of shared object 204. Accordingly, reference object 202 may be located at the previous word relative to the location of shared object 204. Thus, to identify reference object 202, the thread may use the thread's reference to shared object 204 containing the last-known memory address of shared object 204 and read the previous word relative to the reference, thus locating the memory address of reference object 202 and reading from the memory address of reference object 202. The thread may read the previous word by, for example, subtracting a number (e.g., eight) from the memory address of shared object 204. The number may be based on the data alignment of managed runtime 102.

Referring to FIG. 3A, if the last-known memory address of shared object 204 is memory address 0x6000, the location of reference object 202 may be at memory address 0x5ff8 (0x6000-8). Accordingly, the thread may then read reference object 202 located at this address (0x5ff8), thus reading the memory address 0x6000 stored at memory address 0x5ff8. The read memory address is the current memory address of the most up-to-date version of shared object 204. The thread may then locate shared object 204 at current memory address 0x6000 and read shared object 204 at current memory address 0x6000. In an example, the thread may determine a field to read in shared object 204, and read shared object 204 by determining a field offset relative to the current memory address of shared object 204 and reading the field in shared object 204 at the field offset relative to the current memory address of shared object 204.

2. Shared Object Located in Destination Region

A thread (e.g., mutator thread) may start reading shared object 204 after it has been evacuated to the destination region (e.g., by a garbage collector thread or mutator thread). In FIG. 3B, shared object 204 has been evacuated to the destination region, and the copy of shared object 204 is illustrated as shared object 302 in the destination region. Shared object 302 is stored at a memory address 0x8000 in the destination region of the heap. Reference object 202 is stored in the target collection region of the heap and stores the current memory address of the most up-to-date version of shared object 204, shared object 302 at memory address 0x8000. The shared object may have been evacuated from the target collection region to the destination region by a garbage collection thread or a mutator thread.

When a reading thread reads shared object 204 in the target collection region after shared object 204 has been evacuated to the destination region, the thread's last-known memory address of shared object 204 may be different from the current memory address of the most up-to-date version of shared object 204. As will be discussed below, the memory address the thread ends up with (e.g., 0x8000, the current memory address of the most up-to-date version of shared object 204) points to a location in the destination region and is different from the memory address that the thread started with (e.g., 0x6000, the last-known memory address of shared object 204). In this case, the reading of the previous word to indirectly read shared object 204 enables the thread to determine the correct memory address of the most up-to-date version of shared object 204.

The reading thread may perform similar actions as that discussed above with regard to reading the current memory address stored in reference object 202 to locate the most up-to-date location of shared object 204. As discussed above, the thread may identify a last-known memory address of shared object 204. This memory address may be held in a stack location or in a field of another shared object different from shared object 204. In an example, the thread's last-known memory address of shared object 204 may be memory address 0x6000. As discussed, reference object 202 may be located at the previous word relative to the location of shared object 204. Thus, to identify reference object 202, the thread may use the thread's reference to shared object 204 containing the last-known memory address of shared object 204 and read the previous word relative to the reference, thus locating the memory address of reference object 202 and reading from the memory address of reference object 202.

Referring to FIG. 3B, if the last-known memory address of shared object 204 is memory address 0x6000, the location of reference object 202 may be at memory address 0x5ff8 (0x6000-8). Accordingly, the thread may then read reference object 202 located at this address (0x5ff8), thus reading the memory address 0x8000 stored at memory address 0x5ff8. The read memory address is the current memory address of the most up-to-date version of shared object 204, shared object 302. The thread may then locate shared object 302 at current memory address 0x8000 and read shared object 302 at current memory address 0x8000. In an example, the thread may determine a field to read in shared object 302, and read shared object 302 by determining a field offset relative to the current memory address of shared object 302 and reading the field in shared object 302 at the field offset relative to the current memory address of shared object 302.

In FIG. 3B, the memory address that the thread started out with (e.g., memory address 0x6000) was pointing to an out-of-date version of shared object 204, but the subtract and indirect read still produced the correct and current memory address of the most up-to-date version of shared object 204, which is the memory address of shared object 302.

As discussed, when a thread reads an out-of-date version of a shared object after it has been evacuated to the destination region, the thread's last-known memory address of the shared object is different from the current memory address of the most up-to-date version of the shared object. In an embodiment, the thread may determine whether the last-known memory address of the shared object is different from the current memory address of the shared object. When the last-known memory address of the shared object is determined to be different from the current memory address of the shared object, the thread may update the last-known memory address of the shared object to reflect the current memory address of the shared object. For example, the thread may update a reference in a stack location that held the last-known memory address of the shared object by replacing the last-known memory address of the shared object in the stack with the current memory address of the shared object. In another example, the thread may update a field of a shared object that held the last-known memory address of the shared object by replacing the last-known memory address of the shared object in the field with the current memory address of the shared object.

In another embodiment, when the last-known memory address of the shared object is determined to be different from the current memory address of the shared object, the thread does not update the last-known memory address of the shared object to reflect the current memory address of the shared object. Rather, the thread may leave it up to the garbage collector to update the last-known memory address of the shared object. For example, the last-known memory address of the shared object may be updated during the garbage collector's next mark phase.

As discussed above and further emphasized here, FIGS. 1, 2, and 3A-3B are merely examples, which should not unduly limit the scope of the claims. For example, it should be understood that a managed runtime may include more than or fewer than two garbage collectors and may execute more than one application on a computing device. Additionally, although the memory address of reference object 202 has been described as preceding and being adjacent to the memory address of shared object 204, this is not intended to be limiting. Rather, reference object 202 may be stored at a location relative to shared object 204 such that the reading thread may determine the location of reference object 202. For example, reference object 202 may perform a calculation to determine the location of reference object 202. In an example, the thread may determine the location of reference object 202 by determining a size of shared object 204 and reading the memory address adjacent to and following shared object 204.

Further, computing device 104 may be coupled to a network (not shown). The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

C. Alignment of Objects

Managed runtime 102 may double word align objects. For example, objects may typically be stored at a double word boundary in memory. A word may be, for example, eight bytes. Although a word is described as being eight bytes, this is not intended to be limiting, and a word may be any quantity of bytes that is a multiple of four. Further, although managed runtime 102 is described as enforcing the double word alignment of objects, other embodiments that enforce different types of alignment of objects are within the scope of this disclosure.

An object may be stored at a location in memory that is not at a double word boundary. In an embodiment, managed runtime 102 aligns objects along a boundary, and the memory address of reference object 202 does not start at an aligned boundary. This may be advantageous when the object that was last allocated, for example, has only three words and an extra word is free and unused in the last byte of the double word. Rather than leave the space unused, reference object 202 may be stored at the unused space. In this way, space may be saved. A thread that traverses the heap may read, for example, shared object 204 and know that shared object 204 is double word aligned. As such, the thread may identify a start of shared object 204 at the double-word boundary and compute, based on a last-known memory address of shared object 204, a memory address of reference object 202 storing a current memory address of shared object 204. The location of reference object 202 may be in the preceding double word boundary relative to the location of shared object 204. An object may refer to data content and may not necessarily be an object that is double word aligned.

III. Example Method

Figure 4:
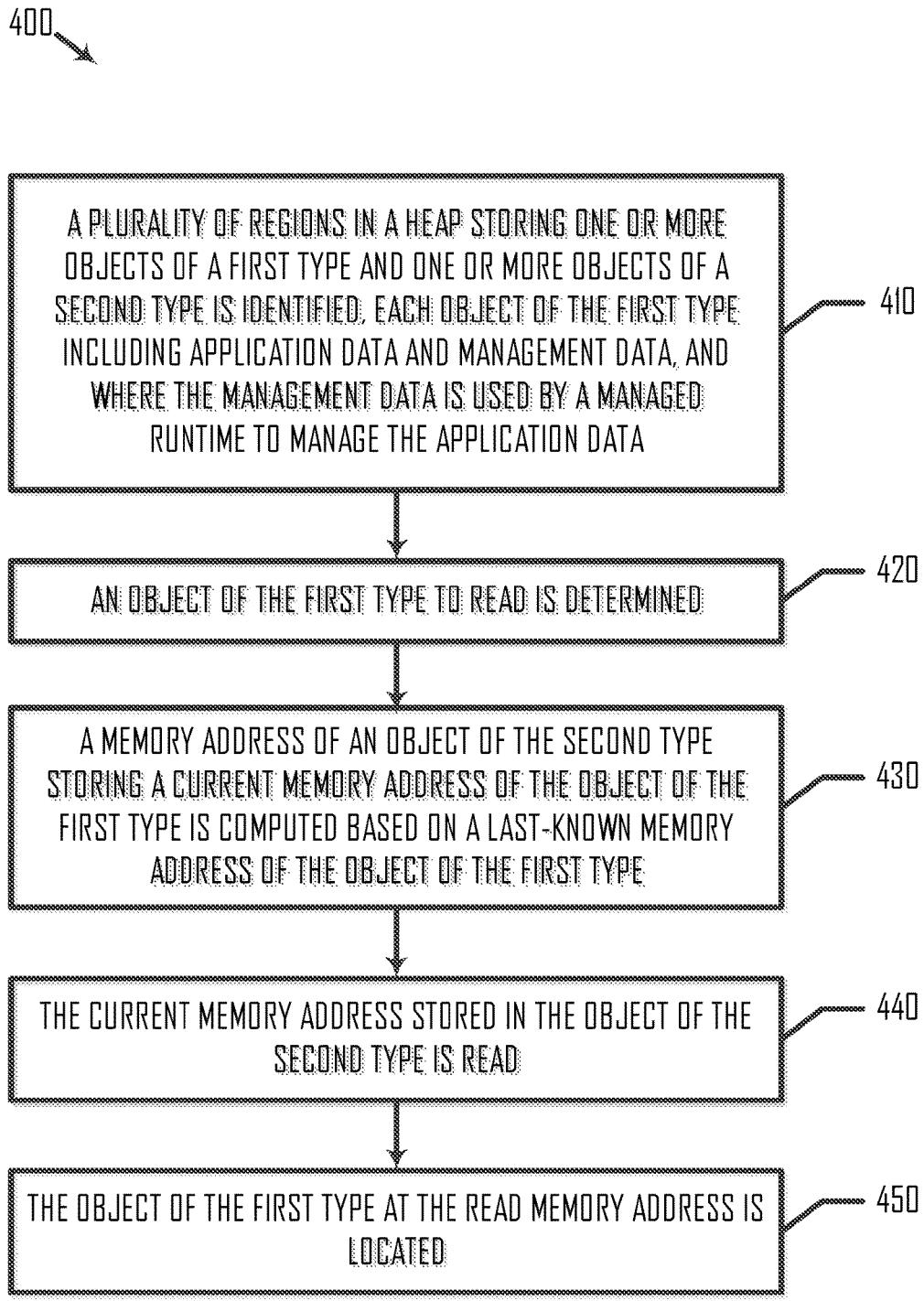
FIG. 4 is a flowchart illustrating a method of managing memory, according to an embodiment.

FIG. 4 is a flowchart illustrating a method 400 of managing memory, according to an embodiment. Method 400 is not meant to be limiting and may be used in other applications.

In FIG. 4, method 400 includes steps 410-450. In a step 410, a plurality of regions in a heap storing one or more objects of a first type and one or more objects of a second type is identified, each object of the first type including application data and management data, and where the management data is used by a managed runtime to manage the application data. In an example, a mutator thread or garbage collector thread may identify a plurality of regions in a heap storing one or more objects of a first type and one or more objects of a second type, each object of the first type including application data and management data, and where the management data is used by a managed runtime to manage the application data. The objects of the first type may be shared objects, and the objects of the second type may be reference objects.

In a step 420, an object of the first type to read is determined. In an example, a mutator thread determines an object of the first type to read. In a step 430, a memory address of an object of the second type storing a current memory address of the object of the first type is computed based on a last-known memory address of the object of the first type. In an example, the mutator thread computes, based on a last-known memory address of the object of the first type, a memory address of an object of the second type storing a current memory address of the object of the first type. In a step 440, the current memory address stored in the object of the second type is read. In an example, the mutator thread reads the current memory address stored in the object of the second type. In a step 450, the object of the first type is located at the read memory address. In an example, the mutator thread locates the object of the first type at the read memory address.

It is also understood that additional method steps may be performed before, during, or after steps 410-450 discussed above. It is also understood that one or more of the steps of method 400 described herein may be omitted, combined, or performed in a different sequence as desired.

For simplicity, a mutator thread has been described as performing the method steps of method 400. It should be understood that a garbage collector thread may also perform the method steps of method 400.

IV. Example Computing System

Figure 5:
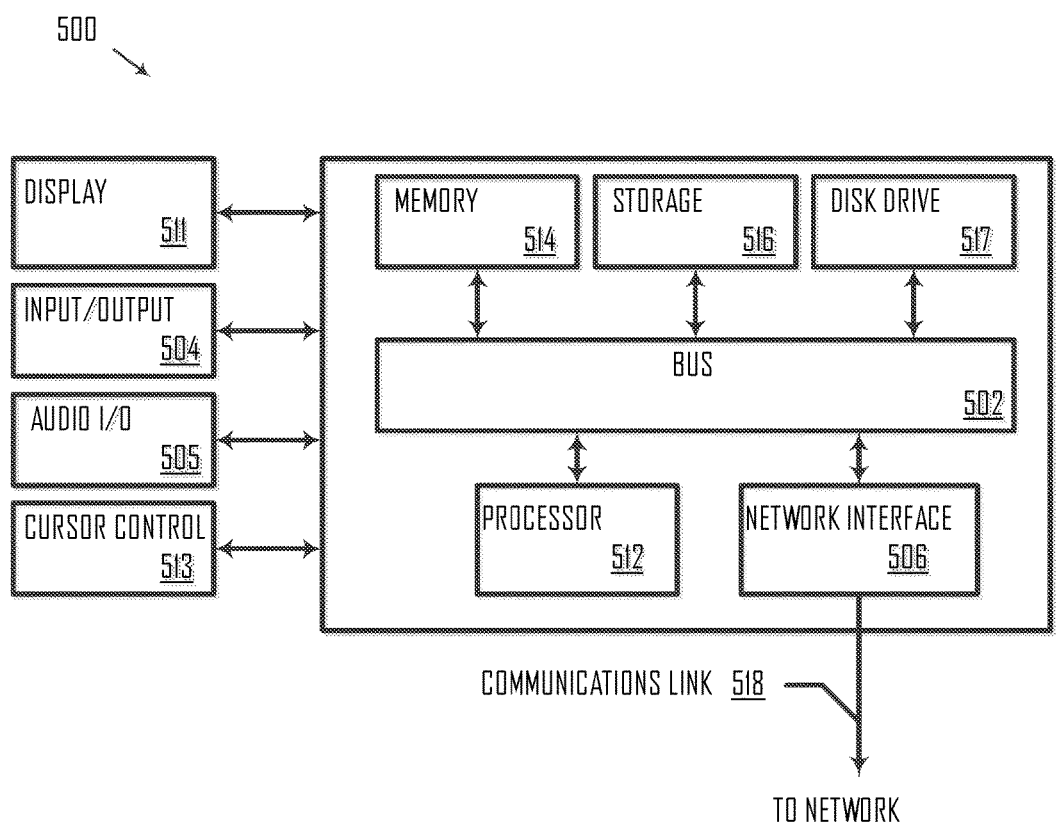
FIG. 5 is a block diagram of an electronic system suitable for implementing one or more embodiments of the present disclosure.

FIG. 5 is a block diagram of a computer system 500 suitable for implementing one or more embodiments of the present disclosure. Computer system 500 may include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or a server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. I/O component 504 may also include an output component such as a display 511, and an input control such as a cursor control 513 (such as a keyboard, keypad, mouse, etc.). A transceiver or network interface 506 transmits and receives signals between computer system 500 and other devices via a communication link 518 to a network. In an embodiment, the transmission is wireless, although other transmission mediums and methods may also be suitable. A processor 512, which may be a micro-controller, digital signal processor (DSP), or other processing component, processes these various signals, such as for display on computer system 500 or transmission to other devices via communication link 518. Processor 512 may also control transmission of information, such as cookies or IP addresses, to other devices.

Components of computer system 500 also include a system memory component 514 (e.g., RAM), a static storage component 516 (e.g., ROM), and/or a disk drive 517. The heap may be allocated from system memory component 514, and the shared objects and the reference objects may be stored on the heap.

Computer system 500 performs specific operations by processor 512 and other components by executing one or more sequences of instructions contained in system memory component 514. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 514, and transmission media includes coaxial cables, copper wire, and fiber optics, including wires that include bus 502. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, memory cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PSTN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of managing memory, the method comprising:

identifying a plurality of regions in a heap storing one or more objects of a first type and one or more objects of a second type, the plurality of regions including a target collection region and a destination region;

determining whether a last-known memory address of a first object of the first type is located in the target collection region; and in response to a determination that the last-known memory address of the first object is located in the target collection region:

computing, based on an offset from the last-known memory address of the first object, a memory address of a second object of the second type, the second object storing a current memory address of the first object;

reading the current memory address of the first object stored in the second object; and locating the first object at the read memory address, wherein the located first object is stored in the destination region, and the last-known memory address of the first object is different from the current memory address of the first object, and wherein the first object has been evacuated from the target collection region to the destination region.

2. The method of claim 1, wherein the computing includes subtracting the offset from the last-known memory address of the first object, and the reading the current memory address includes reading a word stored at the memory address computed based on subtracting the offset from the last-known memory address of the first object.

3. The method of claim 1, wherein the computing includes adding the offset to the last-known memory address of the first object, and the reading the current memory address includes reading a word stored at the memory address computed based on adding the offset to the last-known memory address of the first object.

4. The method of claim 1, wherein the last-known memory address of the first object is adjacent to the memory address of the second object.

5. The method of claim 1, wherein the memory address of the second object precedes the last-known memory address of the first object.

6. The method of claim 1, further comprising:

in response to a determination that the last-known memory address of the first object is not located in the target collection region, locating the first object at the last-known memory address.

7. A system for managing memory, the method comprising:

a memory including a heap, wherein the heap is partitioned into a plurality of regions and stores one or more objects of a first type and one or more objects of a second type, and the plurality of regions includes a target collection region and a destination region; one or more processors coupled to the memory; and one or more mutator threads executing on the one or more processors, wherein a mutator thread determines whether a last-known memory address of a first object of the first type is located in the target collection region, wherein in response to a determination that the last-known memory address of the first object is located in the target collection region, the mutator thread computes, based on an offset from the last-known memory address of the first object, a memory address of a second object of the second type, reads a current memory address of the first object stored in the second object, and locates the first object at the read memory address, wherein the second object stores the current memory address of the first object, wherein the located first object is stored in the destination region, and the last-known memory address of the first object is different from the current memory address of the first object, and wherein the first object has been evacuated from the target collection region to the destination region.

8. The system of claim 7, wherein the mutator thread subtracts the offset from the last-known memory address of the first object, and reads the current memory address by reading a word stored at the memory address computed based on subtracting the offset from the last-known memory address of the first object.

9. The system of claim 7, wherein the mutator thread computes the memory address of the second object by adding the offset to the last-known memory address of the first object, and reads the current memory address by reading a word stored at the memory address computed based on adding the offset to the last-known memory address of the first object.

10. The system of claim 7, wherein the last-known memory address of the first object is adjacent to the memory address of the second object.

11. The system of claim 7, wherein the memory address of the second object precedes the last-known memory address of the first object.

12. The system of claim 7, wherein the located first object is stored in the target collection region.

13. The system of claim 7, wherein in response to a determination that the last-known memory address of the first object is not located in the target collection region, the mutator thread locates the first object at the last-known memory address.

14. A non-transitory machine-readable medium comprising a plurality of machine-readable instructions that when executed by one or more processors is adapted to cause the one or more processors to perform a method comprising:

identifying a plurality of regions in a heap storing one or more objects of a first type and one or more objects of a second type, the plurality of regions including a target collection region and a destination region;

determining whether a last-known memory address of a first object of the first type is located in the target collection region; and in response to a determination that the last-known memory address of the first object is located in the target collection region:

computing, based on an offset from the last-known memory address of the first object, a memory address of a second object of the second type, the second object storing a current memory address of the first object;

reading the current memory address of the first object stored in the second object; and locating the first object at the read memory address, wherein the located first object is stored in the destination region, and the last-known memory address of the first object is different from the current memory address of the first object, and wherein the first object has been evacuated from the target collection region to the destination region.

15. The method of claim 1, wherein the located first object is stored in the target collection region.

* * * * *